United States Patent [19]
Pfister et al.

[11] 3,789,274
[45] Jan. 29, 1974

[54] SOLID ELECTROLYTIC CAPACITORS HAVING HARD SOLDER CATHODE COATING

[75] Inventors: William J. Pfister, Cheshire; George A. Shirn, Williamstown, both of Mass.

[73] Assignee: Sprague Electric Company, North Adams, Mass.

[22] Filed: July 24, 1972

[21] Appl. No.: 274,525

[52] U.S. Cl. ................................... 317/230, 29/570
[51] Int. Cl. .......................... H01g 9/05, H01g 9/06
[58] Field of Search ..................................... 317/230

[56] References Cited
UNITED STATES PATENTS

| | | | |
|---|---|---|---|
| 3,508,118 | 4/1970 | Merrin et al. | 317/101 |
| 3,584,265 | 6/1971 | Nier | 317/234 |
| 3,611,054 | 10/1971 | Piper et al. | 317/230 |
| 3,588,628 | 6/1971 | Peck | 317/230 |
| 3,611,055 | 10/1971 | Zeppieri et al. | 317/230 |
| 3,612,957 | 10/1971 | Steigerwald | 317/230 |
| 3,667,002 | 5/1972 | Klein | 317/230 |
| 3,646,404 | 2/1972 | Matsuo et al. | 317/230 |
| 3,631,302 | 12/1971 | Robinson | 317/230 |

*Primary Examiner*—John W. Huckert
*Assistant Examiner*—William D. Larkins
*Attorney, Agent, or Firm*—Vincent H. Sweeney et al.

[57] ABSTRACT

A solid electrolytic capacitor has an electrically conductive counterelectrode system that can advantageously be contacted without the use of flux, and can subsequently be used for high temperature applications, without any accompanying deterioration or corrosion difficulties. The counterelectrode system employs a sprayed layer of a high melting tin-lead alloy in contact with a coating of carbon on the solid electrolyte. The tin-lead carbon contacting layer can advantageously have a lead content of 95 percent by weight, thereby insuring a relatively high melting point therefor.

9 Claims, 3 Drawing Figures

SOLID ELECTROLYTIC CAPACITORS HAVING HARD SOLDER CATHODE COATING

BACKGROUND OF THE INVENTION

This invention relates to solid electrolytic capacitors and a method of making same, and more particularly to an efficient and reliable electrically conductive counterelectrode system for solid electrolyte capacitors.

An electrolytic capacitor having a solid electrolyte may be produced by first preparing a porous anode by forming a coherent body of sintered particles of a film forming metal, for example tantalum. A dielectric oxide of tantalum is then suitably formed on the outer surfaces of the sintered body, as well as the internal surfaces of the pores. The body is then impregnated with a semiconductive material such as by an impregnation of a manganous salt in liquid form into the interstices of the porous body and subsequently converting the manganous salt to manganese dioxide by pyrolytic decomposition. It has been found that a most satisfactory interpositioning of the manganese dioxide into and on the porous body requires a succession of impregnations and decompositions resulting in a final product having the manganese dioxide filling the spaces between the particles and also disposed on the outside of the body so as to form an overlying coat.

The capacitor is completed by applying a cathode layer thereon, and, if desired, suitably encasing the unit. An electrically conductive coating of carbon particles is deposited on the solid electrolyte, such as by dipping same into an aqueous suspension of graphite. This coating is heat dried to drive off moisture, and serves to provide a low resistance contact to the manganese dioxide coating, thereby lowering the equivalent series resistance of the tantalum anode. In prior art, an intermediate coating of silver paint was applied over the carbon to provide a solderable surface for the unit, and the counterelectrode was completed by applying solder over the silver coating.

While this counterelectrode system has been used for some time in the industry, there have been problems encountered when thusly prepared capacitors are used at relatively high temperatures. For example, when such a unit is run through a circuit board soldering step at approximately 230°–250°C, the solder (60 percent tin –40 percent lead), which melts at approximately 183°C, dissolves silver thereby increasing the equivalent series resistance of the unit. This problem makes the unit much less reliable and can lead to corrosion of the unit when the flux necessarily used with the solder attacks the $MnO_2$ through the dissolved silver. Attempts have been made in the past to find a substitute or replacement for the silver intermediary layer. Metals such as gold, zinc, copper, brass and others have been applied to solid electrolytes as by vapor deposition, dipping, spraying or melting. However, until now, no completely satisfactory, safe and economical substitute has been found.

Some of these prior art methods have used a Schoop gun or plasma arc torch jet to spray metal coats over the silver coat or directly in contact with the carbon layer. Both of these methods of spraying metals utilize extremely high application temperatures, and for that reason, can sometimes be difficult and dangerous to work with. The metal counterelectrodes produced in these and in other similar methods must then be dipped in solder prior to any subsequent attaching steps, and it sppears that flux used therein can penetrate through the rather porous, "non-oxidized" metal sprayed coats of the prior art attacking the $MnO_2$ layer producing a rather poor contact thereby causing the soldered unit to be subject to corrosion. In addition to these problems, the metals used above, for example, copper, gold, silver and the like, are rather expensive to use.

Accordingly, it is an object of the present invention to provide a solid electrolytic capacitor that can withstand exposure to relatively high temperatures.

It is another object of this invention to provide an economical and reliable counterelectrode system for solid electrolytic capacitors.

It is a further object of the instant invention to provide a solid electrolytic capacitor that can be soldered, if necessary, without flux thereby avoiding corrosion problems.

SUMMARY OF THE INVENTION

A solid electrolytic capacitor has an electrically conductive counterelectrode thereon that employs a sprayed coat of a lead-tin alloy that has a lead content of from approximately 81–97.5 percent by weight, and is in direct contact with a conventional carbon or graphite coating on the solid electrolyte. The thusly coated capacitor unit can then be sweated to a lead frame or housing, or the like, and used without the need of further soldering operations.

In another embodiment, the solid electrolytic capacitor having the counterelectrode just described above may also be advantageously used without being encased prior to use. These units having the lead-tin alloy coat are sprayed with a very thin porous coat of a conventional solder (60 percent tin – 40 percent lead), and can then be dipped in solder without the use of a flux therein. Units such as these have no wetting problems and can subsequently be exposed to high temperatures with no fear of deterioration, decomposition or corrosion problems.

DESCRIPTION OF THE PREFERRED EMBODIMENT

Figure 1:
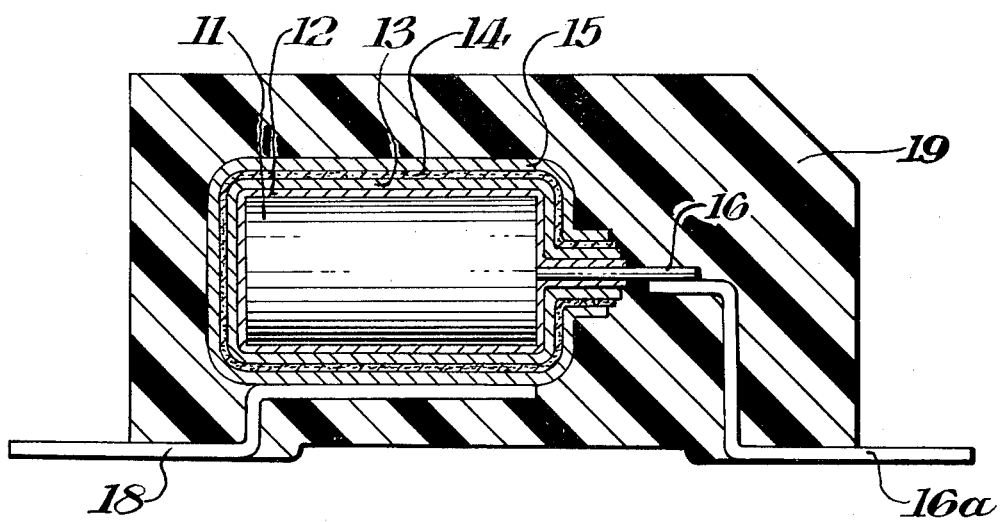
FIG. 1 is a vertical sectional view of a solid electrolytic capacitor produced according to this invention.
Figure 2:
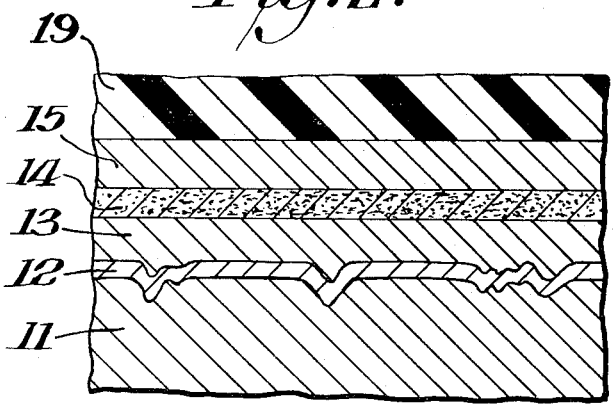
FIG. 2 is a diagrammatic representation of an enlarged cross section of a portion of the capacitor illustrated in FIG. 1 showing its relative parts in greater detail.

FIGS. 1 and 2 of the drawings show a solid electrolytic capacitor of this invention that is produced by first preparing a porous anode by forming a coherent porous body 11 of sintered particles of a film forming metal, for example tantalum, and embedding a metal lead wire 16 therein. A dielectric oxide film 12 of tantalum ($Ta_2O_5$) is then suitably formed on the outer surfaces of the sintered tantalum pellet 11, as well as the internal surfaces of the pores thereof. This dielectric oxide 12 can be advantageously formed by any convenient technique known to those skilled in the art. While tantalum is mentioned specifically herein as the preferred anode metal, other film forming metals such as aluminum, hafnium, titanium, niobium, tungsten and zirconium can be used with similar, although somewhat less desirable, results.

Upon completion of this oxide formation, the pellet is the impregnated with a semiconductive material 13, such as $MnO_2$. This impregnation may be carried out by dipping the pellet into a manganous salt in liquid form that enters into the interstices of the porous body and is subsequently converted to manganese dioxide by a pyrolytic decomposition, for example by heating in an oven at from 200°C to 400°C. It has been found that a most satisfactory interpositioning of the manganese dioxide into and on the porous body requires a succession of impregnations and decompositions resulting in a final product having the manganese dioxide filling the spaces between the particles and also disposed on the outside of the body so as to form the overlying coat 13. Steam pyrolysis can be used to form a dense $MnO_2$ coat that advantageously has a nodular outer surface upon which a rather rough surface can be formed. In this process, the pellets are repeatedly dipped in varying concentrations of manganous nitrate solutions. Each dipping is immediately followed by steam pyrolysis at 300°–350° C for a few minutes that converts the manganous nitrate to the advantageous manganese dioxide outer layer. These steps are repeated as many times as is necessary to completely form a continuous layer of $MnO_2$. A final pyrolytic decomposition can be performed with dry heat to insure the formation of a rather rough surface thereon that advantageously permits a strong adherence of the metal counterelectrode thereto.

The capacitor can then be completed by applying an electrically conductive counterelectrode (cathode) layer thereon, and, if desired, suitably encasing the unit. The pellet first has a carbon or graphite layer 14 applied thereto, as by dipping in "Aquadag," an aqueous suspension of graphite, followed by an air-drying or heating to drive off moisture thereon. This carbn layer 14 serves to provide a low resistance contact to the $MnO_2$ layer, thereby lowering the equivalent series resistance of the tantalum anode. At this point in the prior art, a silver paint is applied over the carbon layer so as to form the counterelectrode for the capacitor. However, dissolution and deterioration of the silver when exposed to the high temperatures have made this counterelectrode unsatisfactory.

A metallic coating 15 of preferably 5 percent tin and 95 percent lead by weight is sprayed over the carbon layer 14 using a spray gun applicator made by the Fiore Company. The Fiore spray gun does not need a flame or an arc to operate, but rather, it operates much the same as a common paint sprayer. The alloy of 5 percent tin – 95 percent lead is held at aprpoximately 400°C in a pot that has a nozzle with a valve in its bottom. When the valve is opened, a stream of the molten alloy runs out the nozzle at a rate controlled by the valve. Immediately outside, a blast of heated nitrogen or air breaks the stream of alloy into small particles and forces them against the pellet or substrate to be coated, which may be preheated if desired. It has been found that a preheating of the pellet to about 50°C facilitates the adherence of the alloy to the pellet. Approximately 80 lbs/in$^2$ of gas at 300°–400°C is a sufficient amount of pressure and heat, for the purposes of this invention, to advantageously use the Fiore spray. The substrates are under this spray at least three or four times at approximately a 45° angle to ensure coverage of the rough $MnO_2$ surface. A thickness of approximately 5 mils of this alloy is necessary to ensure complete coverage of the $MnO_2$ layer, however, a greater thickness could be used for units that are to be encased so that this coating will advantageously be capable of also serving as the bonding material for holding the pellet in a metal housing or the like. It should be noted that the coating should not be so thick so as to cause it to fall from the unit simply from its weight, nor should the coating be so thick that it will not fit into the container which it may subsequently be encased.

Some advantages of this method of application of the metal alloy coat include lower temperature sprays that are not dangerous to use and which do not over-heat the pellets or the alloy itself; better control of the spray pattern; more simplified and economical equipment than is used in forming prior art spray coats; and, the alloy need not be initially used in wire or power form.

While a 5 percent tin and 95 percent lead alloy is preferably used as the metal counterelectrode herein, it should be noted that other tin-lead alloys could also be used with similar, although somewhat less desirable, results, provided such as alloy has a lead content of at least 81 percent, but less than approximately 97.5 percent by weight. Alloys in this region will be stable when exposed to temperatures exceeding approximately 180°C. If less than 81 percent lead is in the metal counterelectrode, then some undesirable melting thereof will always take place at temperatures exceeding 183°C. The phase diagram of lead-tin demonstrates that the 183°C phase persists from pure tin up to about 81 percent by weight of lead, and then the solidus line subsequently increases to the melting point of lead (327°C). If more than 97.5 percent lead content is used, the electrical characteristics of the coated unit become somewhat unreliable and subject to corrosion under high humidity conditions, and additionally, pure lead can be difficult and somewhat dnagerous to work with. A further advantage of using alloys in this prescribed region and at these temperatures, is that tin-lead alloys have a rather large "liquid + solid" region. The alloys in this "liquid + solid" region are characterized by being in a "mushy" or plastic state wherein they are "pliable" and are very easy to work with, especially with respect to making subsequent contacts. Alloys in this region will advantageously be able to withstand exposure to relatively high temperatures, and the preferred 5 percent tin–95 percent lead alloy can most advantageously be exposed to temperatures of 305°–310°C without being subject to any deleterious effects therefrom.

Units thusly prepared may be immediately placed into a suitable metal housing or container having a tin-lead alloy preform therewithin. The metal covered capacitor can be securely held within the housing or header or the like by simply heating the unit so as to cause the 5 percent tin – 95 percent lead coating to become "mushy" and form a bond with the "mushy" perform within the housing. This advantageous capability of these units thereby eliminates the necessity of using silver coats.

Alternatively, and more advantageously, units prepared with this 5 percent tin – 95 percent lead coating may be economically encased in an epoxy resin, or the like. The unit having the 5 – 95 percent coating has an anode lead 16 extending therefrom and is connected to an anode extension lead 16a, as by welding or by any convenient technique known to those skilled in the art. The anode lead extension 16a is advantageously part of a lead frame that also contains a cathode or counterelectrode lead 18 thereon, constructed in such a manner as to cause the coated pellet to rest on the counterelectrode lead 18 when the anode lead 16 is welded to the anode extension lead 16a. This lead frame assembly was described by David B. Peck in his U.S. Letters Patent No. 3,588,628, and assigned to the same assignee as is this invention. When the counterelectrode lead 18 is heated with a hot iron, the 5 – 95 percent tin - lead alloy starts to melt and forms a bond with the counterelectrode lead 18 upon cooling. This unit can then be placed in a suitable mold and covered with an epoxy resin 19, cured for a short time, and removed from the lead frame assembly, so as to form the capacitor unit as shown in FIG. 1. As shown in the drawing the epoxy resin case may have a slanted portion thereon for showing which lead is the anode - the slant provides the user of the capacitor with a proper polarity orientation.

Figure 3:
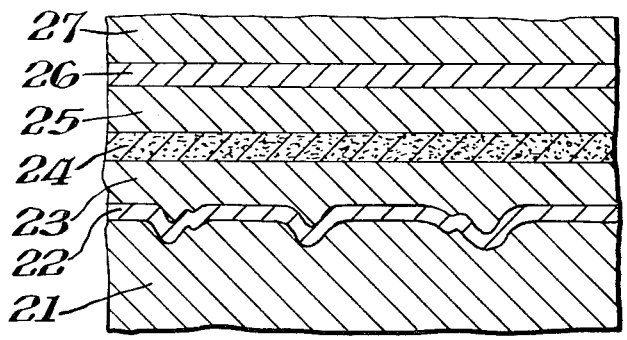
FIG. 3 is a diagrammatic representation of an enlarged cross section of a portion of a capacitor of another embodiment of this invention.

In another embodiment, where the capacitor having the 5 percent tin–95 percent lead alloy thereon is not to be encased, but is rather to be attached directly to a printed circuit board, a thin, porous over-spray of approximately 60 percent tin–40 percent lead may be deposited thereon by a Fiore spray gun as described herein earlier. FIG. 3 shows this thin over-spray coat 26 being in contact with the 5 percent tin–95 percent lead coat 25 which in turn has been deposited on the graphite or carbon layer 24. The sintered tantalum pellet 21, on which the above metals are deposited, has a dielectric oxide 22 and semiconductive $MnO_2$ layer 23 applied thereon, in the same manner as described herein earlier. A unit prepared in this manner can then be dipped into a fluxless solder 27 of, for example, approximately 60 percent tin and 40 percent lead, and can subsequently be easily sweated onto a printed circuit (PC) board. If a solder with flux were used, the over-spray coat 26 would not be needed, however the unit could be subject to corrosion as the flux could penetrate through the pores of 5 percent tin–95 percent lead layer 25 and carbon layer 24. The use of an over-spray coat and a fluxless solder advantageously provide a reliable uncased solid electrolytic capacitor that can withstand exposure to high temperatures and can easily be sweated onto PC boards.

The 5 percent tin–95 percent lead coating is most advantageously applied herein by being forced out of a Fiore spray gun with a stream of gas, such as nitrogen or the like. This gas does not overly oxidize this coating, however no other special, non-oxidizing precautions need be taken in depositing this metal coat, as is the case in some prior art sprayed units. A stream of air could also be used with similar, although somewhat less desirable, results. If this coating became too oxidized then any subsequent sprayed metal layers would not achieve a good electrical contact therewith. However, the force of over-spray coat being sprayed onto the 5 percent tin–95 percent lead coat or layer breaks through the relatively small amount of oxide formed thereon, and provides a surface for the unit that can easily be wetted by a fluxless solder without any accompanying problems of corrosion or the like. Apparently, when flux is used any subsequently applied solder wets the high melting electrode all the way to the layer of carbon particles causing corrosion; however, when on flux is used, the small amount of oxide on the over-spray metal layer keeps the solder from penetrating to the carbon layer and disturbing the contact.

The over-spray and fluxless solder outer coat of the uncased solid electrolytic capacitor is described as a conventional 60–40 percent tin-lead solder, however, to be more accurate, this conventional or eutectic solder is actually composed of 61.9 percent tin and 38.1 percent lead.

There are many advantages of these capacitors and the method of making them over prior art units and processes. Some of these advantages include: the tin-lead alloys used herein are much less expensive than the silver and copper used in some prior art units; the sprayed metal coats need not be substantially oxide-free, thereby eliminating the expense and difficulties of such a requirement; the process utilizes a relatively cool spray, thereby making the process less dangerous; a capacitor having the spray coats of this invention can be dipped in, and wetted by, a fluxless solder; the capacitors produced herein can be exposed to relatively high temperatures with no accompanying harmful or deleterious effects; the ability of uncased capacitors of this invention to be easily sweated onto PC boards without the use of flux; and the ability of encased capacitors of this invention to be manufactured without silver or copper or the like.

The above-described specific embodiments of the invention have been set forth for the purpose of illustration. It will be apparent to those skilled in the art that various modifications may be made in the capacitor and counterelectrode system of this invention without departing from the principles and scope of this invention is pointed out and disclosed herein. For that reason, it is not intended that the invention should be limited other than by the scope of the appended claims.

What is claimed is:

1. A solid electrolytic capacitor comprising a film forming metal anode; a dielectric oxide layer on said metal anode; a layer of semiconductive material over said dielectric oxide layer; and, an electrically conductive counterelectrode comprising a layer of carbon particles over said semiconductive layer, and a layer of a tin-lead alloy over and in direct contact with said carbon particles, said tin-lead alloy having a lead content of at least 81 percent and less than approximately 97.5 percent by weight.

2. The capacitor of claim 1 wherein said metal anode is at least one film-forming metal selected from the group consisting essentially of tantalum, aluminum, hafnium, titanium, niobium, tungsten and zirconium.

3. The capacitor of claim 2 wherein said metal anode is tantalum, said dielectric oxide is tantalum pentoxide; and, said semiconductive material is manganese dioxide.

4. The capacitor of claim 1 wherein said tin-lead alloy is composed of 5 percent tin and 95 percent lead.

5. The capacitor of claim 4 wherein said anode and said counterelectrode having metal leads extending outward therefrom; and said capacitor is encased in an epoxy resin, said anode lead and said counterelectrode lead extending out from said epoxy resin.

6. The capacitor of claim 4 wherein said counterelectrode includes an additional porous layer of solder overlying sad tin-lead alloy layer, and a further layer of fluxless solder overlying said porous solder layer.

7. The capacitor of claim 5 wherein said manganese dioxide layer has a rough outer surface.

8. The capacitor of claim 6 wherein said manganese dioxide layer has a rough outer surface.

9. A solid electrolytic capacitor comprising a tantalum anode having a metal lead extending outward therefrom; a layer of tantalum pentoxide on said tantalum anode; a layer of manganese dioxide over said tantalum pentoxide layer, said manganese dioxide layer having a rough outer surface; an electrically conductive counterelectrode comprising a layer of carbon particles over said manganese dioxide layer, and a layer of 5 percent tin-95 percent lead over and in direct contact with said carbon particles, said counterelectrode having a metal lead attached thereto and extending out therefrom; and an epoxy resin covering over said capacitor, said anode lead and said counterelectrode lead extending out from said epoxy resin.

* * * * *